(No Model.)
E. D. SON.
CORN HOLDER.
No. 565,369. Patented Aug. 4, 1896.
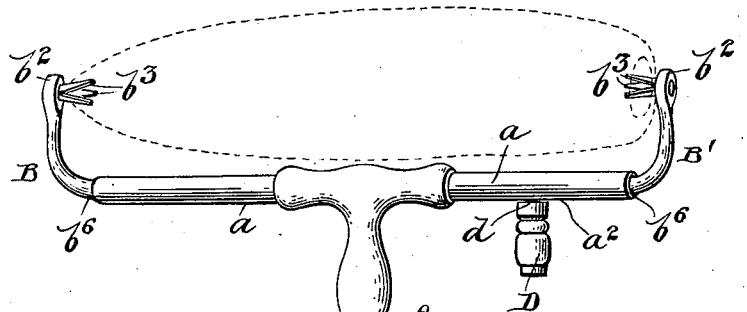
Fig. 1.
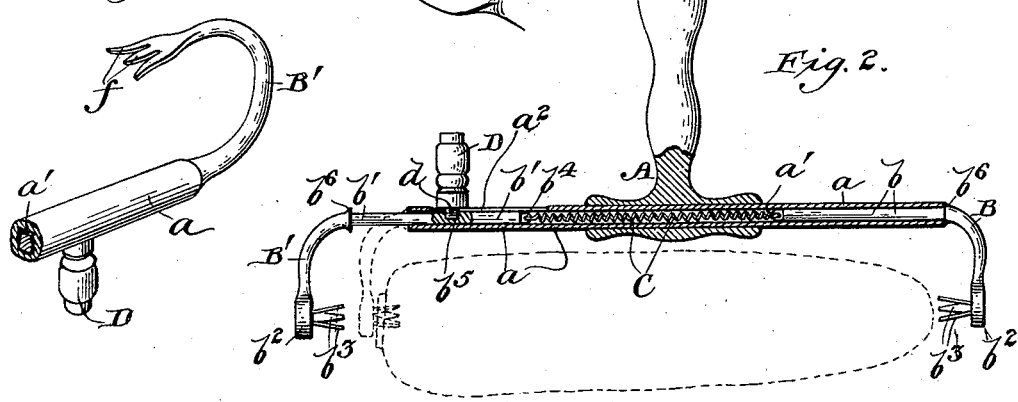
Fig. 3.
Fig. 2.
WITNESSES
Severance.
N. S. Hockman.
INVENTOR
Eleanor D. Son
by Mason, Fenwick and Lawrence
her Attorneys

UNITED STATES PATENT OFFICE.

ELEANOR D. SON, OF UTICA, NEW YORK.

CORN-HOLDER.

SPECIFICATION forming part of Letters Patent No. 565,369, dated August 4, 1896.

Application filed May 15, 1896. Serial No. 591,685. (No model.)

*To all whom it may concern:*

Be it known that I, ELEANOR D. SON, a citizen of the United States, residing at Utica, in the county of Oneida and State of New York, have invented certain new and useful Improvements in Corn-Holders; and I do hereby declare the following to be a full, clear, and exact description of the invention, such as will enable others skilled in the art to which it appertains to make and use the same.

My invention relates to improvements in table tongs or forks, and has more particular relation to devices for holding ears of corn while eating the grains thereof.

The invention consists of the combination of a handle having a hollow cross-bar at one end, of corn-ear-holding arms adapted to slide in the opposite ends of the hollow bar, a spring within said bar and connecting said arms to hold them normally together, and a handle on one of said arms for moving it in and out.

It also consists of certain other novel constructions, combinations, and arrangements of parts, all of which will be hereinafter more particularly set forth and claimed.

In the accompanying drawings, forming part of this specification, Figure 1 represents a front elevation of my invention as it appears when in use. Fig. 2 represents a central vertical section, partly in side elevation, of said device; and Fig. 3 represents a detail perspective view of one end of a modified form of my improved corn-ear holder.

A in the drawings represents the handle; B and B', the corn-ear-holding arms; C, the spring, and D the operating-handle of one of the corn-ear-holding arms.

The handle A is of any desired ornamental shape and is provided at its upper end with a hollow cross-bar $a$, extending an equal distance on each side of the said handle. The aperture $a'$ through this cross-bar is preferably square or angular in cross-section, so that the squared or angular shanks $b\,b'$ of the arms B B' may slide longitudinally therein without turning. A slot $a^2$ is formed in said cross-bar $a$ for a purpose hereinafter described. Each of the arms B B' is angular and is provided on one end with an enlargement $b^2$, having a number of prongs or teeth $b^3$, adapted to penetrate or grip and hold the corn. The opposite end of each arm is squared, so as to fit loosely within the squared passage of the cross-bar. The end of each arm is formed with an eye $b^4$, and the respective ends of the coil-spring C are secured in said eyes, thus connecting the arms and holding them normally together. The arms are each provided with an annular shoulder $b^4$ for limiting their inner movement by contacting with the outer ends of the cross-bar.

The operating-handle D is provided with a screw-threaded shank $d$, that projects through the slot $a^2$ and screws into a screw-threaded recess $b^5$, formed in the shank $b'$.

When it is desired to secure an ear of corn in the holder, tongs, or fork, the arms are first forced apart against the tension of the coil-spring by the handle D and the ear inserted between the pronged ends of the arms and the handle released. The tension of the spring pulls the arms together and the prongs engage and firmly hold the ear and prevent its rotation.

It will be observed that in applying this holder to or removing it from an ear of corn it is not necessary to soil the fingers at all, as the entire operation is accomplished by moving the operating-handle. It will also be observed that in eating corn only one hand is necessary, and the other may be used for buttering or salting the ear.

In Fig. 3 I have shown a modification of my invention in which the corn-holding prongs $f$ are formed integral with the adjustable arms.

Having thus described my invention, what I claim as new, and desire to secure by Letters Patent, is—

In a corn-holder, the combination of a handle, a hollow cross-bar secured at one end thereto and formed with a longitudinal slot, movable corn-holding arms adapted to slide freely in the opposite ends of said hollow bar, a spring within said bar and connecting said arms to hold them normally together, and an operating-handle passing through the slot in the cross-bar and engaging one of said arms for moving it out against the tension of the spring to allow the corn to be placed in position between the arms, substantially as described.

In testimony whereof I hereunto affix my signature in presence of two witnesses.

ELEANOR D. SON.

Witnesses:
H. V. B. HORN,
JAMES B. PADDON.